(12) United States Patent
Martin et al.

(10) Patent No.: US 10,783,524 B2
(45) Date of Patent: Sep. 22, 2020

(54) RESOURCE CUSTOMER IDENTITY VERIFICATION

(71) Applicant: EnergyHub, Inc., Brooklyn, NY (US)

(72) Inventors: Andrew Martin, Brooklyn, NY (US); Seth Frader-Thompson, Brooklyn, NY (US)

(73) Assignee: EnergyHub, Inc., Brooklyn, NY (US)

( * ) Notice: Subject to any disclaimer, the term of this patent is extended or adjusted under 35 U.S.C. 154(b) by 734 days.

(21) Appl. No.: 14/570,753

(22) Filed: Dec. 15, 2014

(65) Prior Publication Data

US 2015/0170154 A1 Jun. 18, 2015

Related U.S. Application Data

(60) Provisional application No. 61/915,896, filed on Dec. 13, 2013.

(51) Int. Cl.
*G06Q 30/00* (2012.01)
*G06Q 30/02* (2012.01)
*G06Q 50/06* (2012.01)

(52) U.S. Cl.
CPC ....... *G06Q 30/016* (2013.01); *G06Q 30/0207* (2013.01); *G06Q 50/06* (2013.01)

(58) Field of Classification Search
CPC ......... G06Q 50/00; G06Q 20/00; G06Q 30/00
See application file for complete search history.

(56) References Cited

U.S. PATENT DOCUMENTS

| | | | | |
|---|---|---|---|---|
| 7,715,951 B2* | 5/2010 | Forbes, Jr. | ............. | G01D 4/004 323/299 |
| 2008/0091833 A1* | 4/2008 | Pizano | ................. | G06F 21/602 709/229 |
| 2010/0094699 A1* | 4/2010 | Beal | .................... | G06O 30/0227 705/14.25 |
| 2012/0123995 A1* | 5/2012 | Boot | .................. | G01R 21/1333 706/54 |
| 2012/0173251 A1* | 7/2012 | Gillin | ..................... | G06Q 30/02 705/1.1 |
| 2012/0240204 A1* | 9/2012 | Bhatnagar | ........... | H04L 63/0428 726/5 |
| 2012/0316950 A1* | 12/2012 | LaPorte | ............. | G06Q 20/3276 705/14.33 |
| 2013/0035992 A1* | 2/2013 | Silverman | .............. | G06Q 50/06 705/14.1 |
| 2013/0046695 A1* | 2/2013 | Acosta-Cazaubon | ........................ | G06Q 50/06 705/63 |
| 2013/0124362 A1* | 5/2013 | Katcher | ............. | G06Q 30/0633 705/26.8 |

(Continued)

Primary Examiner — Maria C Santos-Diaz
(74) Attorney, Agent, or Firm — Fish & Richardson P.C.

(57) ABSTRACT

Resource providers that provide a resource (e.g., electricity) to customers often have programs that operate to save customers money or otherwise benefit the customers. Traditionally, customers enroll in these programs by assenting to enroll in combination with providing that customer's account number. For various reasons, requiring the customer to provide his or her account number dramatically reduces the number of customers that ultimately sign up for a program. Accordingly, customer's willing to sign up for programs offered by the resource provider can do so without the need to give a customer number. Rather, the necessary information can be determined based on an image of the customer's meter.

19 Claims, 10 Drawing Sheets

(56) References Cited

U.S. PATENT DOCUMENTS

| | | | | |
|---|---|---|---|---|
| 2013/0176141 A1* | 7/2013 | LaFrance | ............... | G08C 17/02 |
| | | | | 340/870.02 |
| 2013/0197945 A1* | 8/2013 | Anderson | ............... | G06Q 10/10 |
| | | | | 705/4 |
| 2014/0244373 A1* | 8/2014 | Laiderman | ......... | G06Q 30/0225 |
| | | | | 705/14.26 |
| 2014/0266594 A1* | 9/2014 | Reiser | ................. | G06F 3/04842 |
| | | | | 340/5.72 |
| 2015/0081570 A1* | 3/2015 | Gedela | ................... | G06Q 30/01 |
| | | | | 705/304 |
| 2017/0178174 A1* | 6/2017 | Mitchell | ............ | G06Q 30/0233 |

* cited by examiner

RESOURCE CUSTOMER IDENTITY VERIFICATION

CROSS-REFERENCE TO RELATED APPLICATIONS

This application claims the benefit of priority to U.S. Provisional Application No. 61/915,896, filed Dec. 13, 2013 and entitled "System and Method for Customer Identity Verification," the entirety of which is incorporated herein by reference.

TECHNICAL FIELD

This disclosure generally relates to mechanisms that mitigate the need to enter an account number in order for customers of utility-type resources to enroll in programs offered by the resource provider.

BACKGROUND

Providers of resources such as utility-based resources commonly offer certain programs to customers. Traditionally, program enrollment is accomplished by providing a customer account number that identifies the customer to the resource provider offering the program.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to resource customer identity verification without the need to provide an account number. An imagine device can be configured to generate meter image data representing an image of a meter device that monitors consumption of a resource provided by an associated resource provider. A meter identification component can be configured to analyze the meter image data. In response, the meter identification component can generate meter identification data representing data that identifies the meter device. A program enrollment component can be configured to present to a display an indication that enrollment in a program, offered by the resource provider to customers of the resource provider, has been successful in response to a determination that the meter identification data is associated with a customer account identity determined to be eligible to enroll in the program.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which:

FIG. 6 represents a graphical illustration that depicts an example presentation by the preview component in accordance with certain embodiments of this disclosure;

DETAILED DESCRIPTION

Overview

Figure 1:
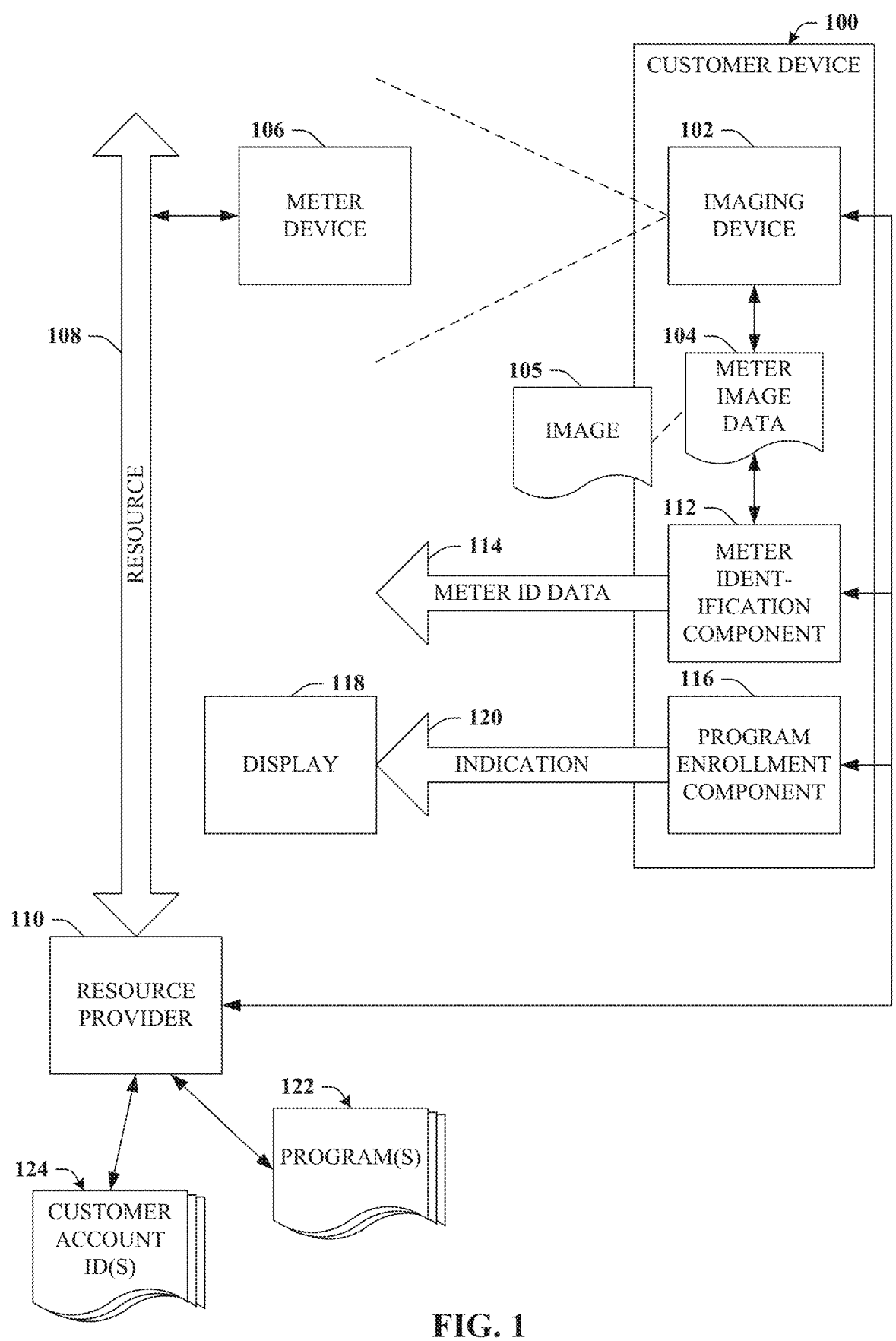
FIG. 1 illustrates a block diagram of an example system that can facilitate resource customer identity verification based on an image of a meter device, rather than based on an account number in accordance with certain embodiments of this disclosure.

Electric, water, gas, and other utility providers, referred to herein as "utilities" or "providers," run programs eligible customers are invited to apply. In many cases, the utility must verify that a customer applying for the program is in fact a customer of the utility and that the customer is eligible according to the rules and requirements laid out for such program.

Typically, utilities invite customers to apply for a given program by completing a written "scissor form," so called because they often are part of the program's promotional literature and must be detached from the promotional literature by means of scissors. Increasingly, customers may apply for these programs by calling a phone number, visiting the utility's website, or using a mobile device application provided by or on behalf of the utility.

One of the key methods utilities use to verify each potential program participant's eligibility for the program is his/her utility account number. Unlike other commonly known data such as name, address, birthday, phone number, email address, or Social Security number, a relatively small number of customers have memorized their utility account number. While this number is often readily available on the customer's bill, many customers do not save their utility bills, and some customer enrolled in automatic payment programs may not ever see their monthly bill.

Even when customers have access to their monthly bill, the hassle of locating it and transcribing their account number from the bill to the program's application form (whether physical or digital) can cause a number of customers to abandon their interest in program enrollment. Indeed, utility customers have been shown to be more than three times more likely to sign up for similar utility programs when the account number is not required. In some cases, utility providers are incentivized with cost savings, subsidies, or the like when acquiring enrollees, so increasing the number of utility customers to sign up for a program can be advantageous.

Furthermore, even when the monthly bill is obtained, it is difficult for some to read and the account numbers are often many characters long, such that customers often provide the wrong account number even when the bill is directly in front of them. Additionally, the program may be administered by a third-party that does not have direct access to the utility's customer database and therefore may not be able to correct obvious errors in the application data, including an error with the account number.

The end result is that it becomes more expensive for utilities to achieve their program targets and goals as (for example) filed with their state utility commissions because they have to market to more customers in order to achieve the desired customer yield.

One solution to this challenge faced by utilities comes from the increasing prevalence of mobile devices with built in cameras. The vast majority of residences have individual water, electricity, gas, or other meter provided by the relevant utility. Instead of verifying a customer's identity by using their account number, the utility could leverage or provide a mobile application that allows the customer to take a picture of their water, electricity, gas, or other on-site utility meter or to use a previously taken picture accessible from the device.

The meter image could be processed locally by the application (such as by using optical character recognition for the meter's identification number, scanning for a bar/QR code or similar code on the meter, or otherwise identifying the specific meter) and the resulting identification credentials transmitted to a remote computer system of the utility (or entity operating the program on the utility's behalf). Alternatively, the application could send the raw image to the utility's remote computer system for processing by that system. The credential and/or image transmission can be accomplished by any established local to remote communications method and may be secured by an establish security method, both of which are known to those skilled in the art of computer communications, networking, and security.

The validity of the image can also be confirmed by meta-data, such as latitude and longitude of the mobile device, which can be embedded in the image or obtained from the mobile device directly and compared to the meter's known geographic location.

The application can provide "real-time" feedback (that is, feedback with low latency, often not noticeable or relevant to a human actor) such that if additional information were necessary to identify the user or if the quality of the image was not satisfactory, the user/customer could be instructed to provide the necessary additional information or re-take the image.

A similar system to that described above could be implemented using a digital still or video camera and a computer with a desktop or web-based application that allowed the user/customer to select a digital still photo or video for analysis and/or upload.

A slightly lower tech system (but still lower user effort) could be constructed by asking the user to email a photo of the meter to the utility itself or a utility-designated service provider.

Customers who happen to know their utility account number or other relevant credentials could always just type it in to the application.

A key advantage to the system and method described here is that it limits the work required on the user's part versus searching for a difficult to locate (and often difficult to read) bill. Similar low-effort identity verification could be accomplished by means of a fingerprint scanner (increasingly prevalent on mobile devices), iris scanner, or other biometric device, as well as by online identity verification using the user/customer's online profile, such as from Google, Facebook, LinkedIn, etc. Such verification can often be accomplished by a few taps on a mobile phone, saving a lot of time, energy, and error that comes from searching for the utility bill and transcribing the account number.

A mobile, desktop, or web-based software application that allows customers to apply to the utility's programs could also be used as a promotional tool for other rebates, incentives, or utility programs for which the customer is eligible. Moreover, the application could remember the verified identity of the customer received as a result of the meter image, biometric profile, online profile, etc. such that it would not be required during future program application processes.

The two-way nature of advanced meter infrastructure (AMI) deployments could create additional methods for low-effort customer identity verifications. In response to a customer initiating the process of applying for a rebate, incentive, program, etc., the utility could send a signal via its AMI network to the customer's in-premise water, gas, electric, etc. meter which would cause the meter to send out an RF pulse, audible tone, or other signal that the mobile device, desktop computer, telephone, etc. could detect and send back to the utility system as part of the process. If the received signal matched what was sent, the customer's premise and identity could be verified.

An electric utility could also perform this method by causing the in-premise electric meter to insert "noise" on top of the in-home electrical signal such that the power cord for the desktop computer or charging cord from the mobile device could detect and send back the encoded signal to the utility. These data on top of electricity signal techniques are well understood by those skilled in the art of power line carrier (PLC) and other similar technologies. It offers the additional security advantage of requiring in-premise access, not just near-premise access, as in the case where a non-resident took a picture of the utility meter of another premise.

Such practices and techniques are not limited to electricity, water, and gas companies. They could also be used by other companies with in-premise equipment, such as cable/satellite television providers, internet and data service providers, and telephone and voice service providers to similar ends.

Example Systems for Image-Based Verification

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can consent to providing data in connection with data gathering aspects. In instances where a user consents to the use of such data, the data may be used in an authorized manner. Moreover, one or more implementations described herein can provide for anonymization of identifiers (e.g., for devices or for data collected, received, or transmitted) as well as transparency and user controls that can include functionality to enable users to modify or delete data relating to the user's use of a product or service.

With reference now to the drawings, referring initially to FIG. 1, a customer device 100 is depicted. Customer device 100 can facilitate resource customer identity verification based on an image of a meter device, rather than based on an account number. The image can be captured by the customer device or received from a remote source. The image can be stored for later access or recall. Customer device 100 can be, e.g., a mobile phone, tablet, laptop, digital camera, or other computing device; and can include a memory that stores computer executable components and a processor that executes computer executable components stored in the memory, examples of which can be found with reference to FIG. 9. It is to be appreciated that the computer 902 can be used in connection with implementing one or more of the systems or components shown and described in connection with FIG. 1 and other figures disclosed herein. As depicted, customer device 100 can include imaging device 102, a meter identification component 112, and a program enrollment component 116.

Imaging device 102 can be configured to generate meter data 104. Meter data 104 can represent (e.g., upon media-based decoding of meter data 104) an image 105 of a meter device 106. Meter device 106 can be any suitable device that monitors consumption of a resource 108 (e.g., electricity, gas, water, air, steam, etc.) that is provided by resource provider 110. In alternative embodiments, meter image data 104 can be transmitted to customer device 100 (e.g., at the time of installation of a new meter device 106). Hence, customer device 100 is not required in all embodiments to include imaging device 102. Customer device 100 can store image 105 and/or meter image data 104, which can be leveraged in various ways as disclosed herein.

Meter identification component 112 can be configured to analyze meter image data 104 and/or image 105. Based on such analysis, meter identification component 112 can generate meter ID data 114 that identifies meter device 106. Additional detail relating to analysis and identification associated with meter identification component 112 can be found in connection with FIG. 2.

Program enrollment component 116 can be configured to present certain data to a display 118. Display 118 can in some embodiments be included in customer device 100, examples of which are provided in connection with FIGS. 5 and 6. In some embodiments, display 118 can be remote from customer device 100. In this example, program enrollment component 116 presents to display 118 indication 120. Indication 120 indicates that enrollment in a program (e.g., from among one or more programs 122) offered by resource provider 110 has been successful. Said differently, indication 120 informs the viewer that he or she has been successfully enrolled in program 122. It is understood that enrollment can be accomplished without the need for the customer to provide an account number. Rather, meter ID data 114 that was determined from meter image data 104 was used to identify the account number and/or the associated customer, so indication 120 informs the customer that enrollment is complete.

Program enrollment component 116 typically provides indication 120 in response to a determination that the meter ID data 114 is associated with a customer account identity 124 and that customer account identity 124 is eligible to enroll in program 122. Such determinations, that meter ID data 114 is associated with customer account identity 124 and that customer account identity 124 is eligible to enroll in program 122 can, in some embodiments, be determined by a remote device (e.g., server device 304) associated with resource provider 110. Additional detail in connection with program enrollment component 116 can be found with reference to FIG. 3.

Figure 2:
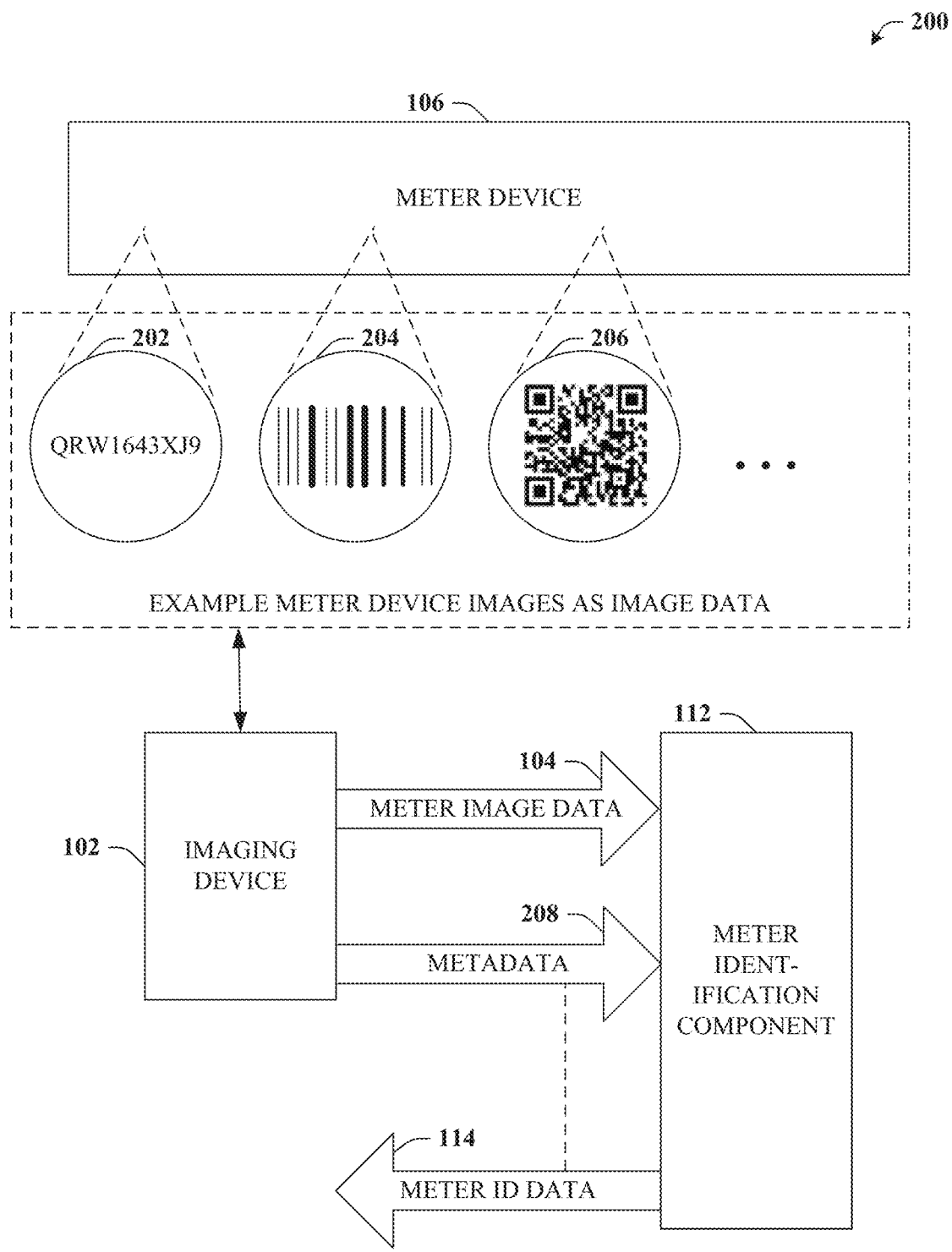
FIG. 2 provides a block diagram of an example system that provides for additional aspects, elements, or detail in connection with the meter identification component in accordance with certain embodiments of this disclosure.

Referring now to FIG. 2, system 200 is illustrated. System 200 provides for additional aspects, elements, or detail in connection with the meter identification component 112. As noted in connection with FIG. 1, imaging device 102 (or another element or device) can capture meter image data 104, by, for instance, taking a photographic image 105 of meter device 106 that is encoded as meter image data 104. This image 105 can include indicia that specifically identifies the meter device 106. Such can be, for example, an alpha-numeric code 202, a bar code 204, a quick response (QR) code 206, or any other suitable element.

Meter image data 104 and/or a relevant portion of such can be provided to meter identification component 112. In some embodiments, metadata 208 can be provided to meter identification component 112. Metadata 208 can include certain data about meter image data such as, for example, a time or date associated with the capture of image 105, a location (e.g., latitude and longitude coordinates, etc.) associated with image 105, and so on. Meter identification component 112 can determine a relevant portion of image 105 and/or an associated portion of meter image data 104 that includes identification indicia (e.g., 202, 204, 206 or other) associated with the meter, and can generate meter ID data 114 in response to receiving meter image data 104. Meter ID data 114 can be a representation or translation of identification indicia 202-206 and can include all or portions of metadata 208.

Figure 3:
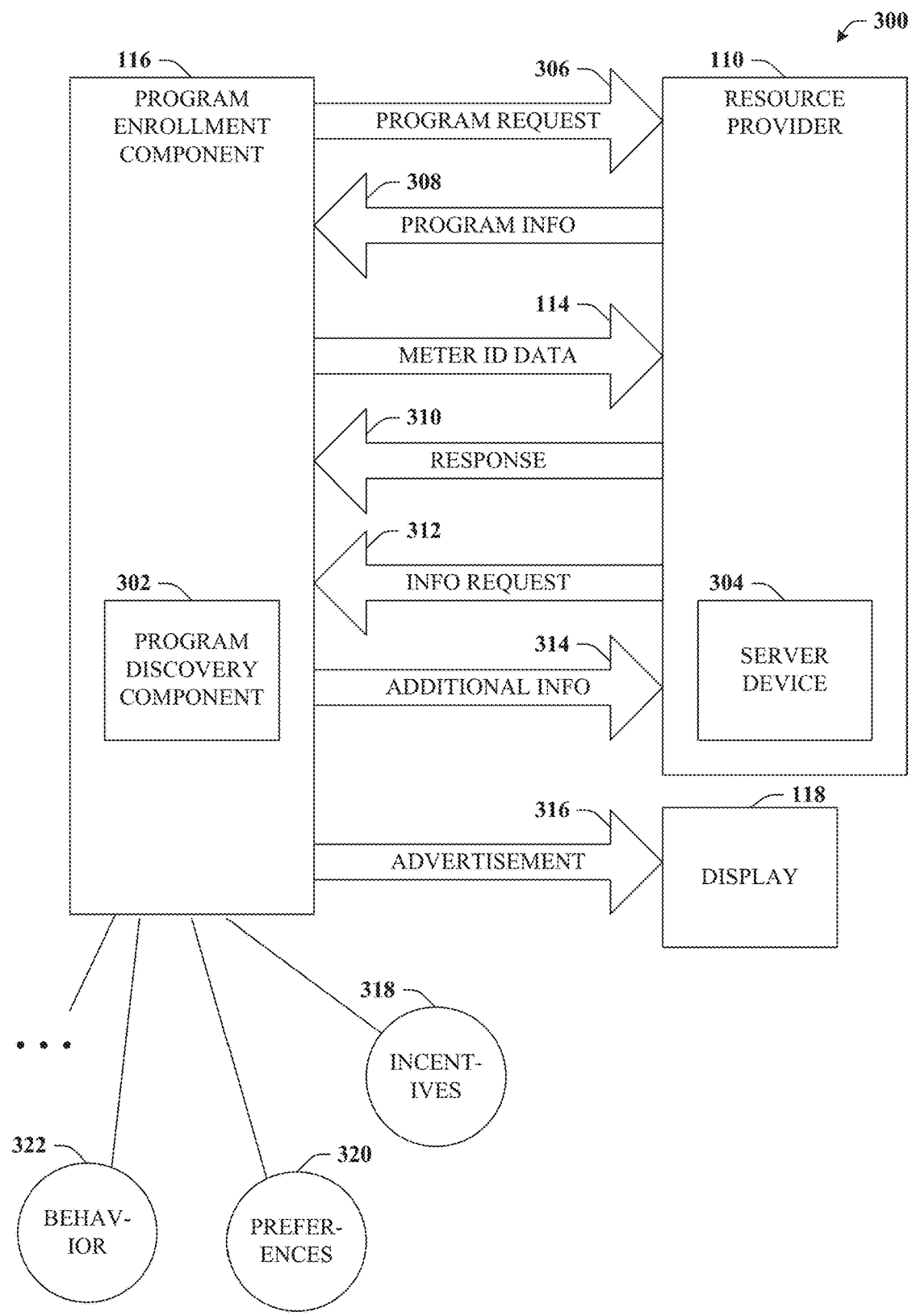
FIG. 3 illustrates a block diagram of an example system that provides additional aspects, elements, or detail in connection with the program enrollment component in accordance with certain embodiments of this disclosure.

Turning now to FIG. 3, system 300 is provided. System 300 provides additional aspects, elements, or detail in connection with the program enrollment component 116. In some embodiments, program enrollment component 116 can include a program discovery component 302. Program discovery component 302 can interface to a server device 304 associated with resource provider 110 and generate a program request 306. Program request 306 can request program information relating to program(s) 122 offered by resource provider 110 and, in response, program information 308 that details one or more programs 122. Based on program information 308, program discovery component 302 can present to display 118 an advertisement 316 for one or more programs 122 that comprises all or a portion of program information 308. In some embodiments, program discovery component 302 can select which advertisements 316 to present based on various data relating to an associated customer, such as, for example, incentives 318 that are beneficial to the customer, preferences 320 of the customer, or based on a history of behavior 322 associated with the customer.

In some embodiments, program enrollment component 116 can transmit meter ID data 114 to resource provider 110 (and/or server device 304) and receive a response 310 that indicates the customer account identity 124 has been enrolled in the program 122. Such can be provided, for example, once resource provider 110 verifies (e.g., from meter image data 104) customer account identity 124 and that customer account identity 124 is eligible for program 122. Based on response 310, customer device 100 can provide indication 120 to display 118, as detailed at FIG. 1.

In some embodiments, program enrollment component 116 can receive from server device 304 (and/or resource provider 110) an information request 312. Information request 312 can represent a request for additional information relating to the meter identification data 114 or to the customer. Info request 312 can be, for example, a request to submit another image 105 (e.g., in response to a failed translation to meter ID data 114, or a request to provide other data such as, e.g., metadata 208. In response to info request 312, program enrollment component 116 can transmit the requested additional information 314 to server device 304. Thereafter, response 310 can be received.

Figure 4:
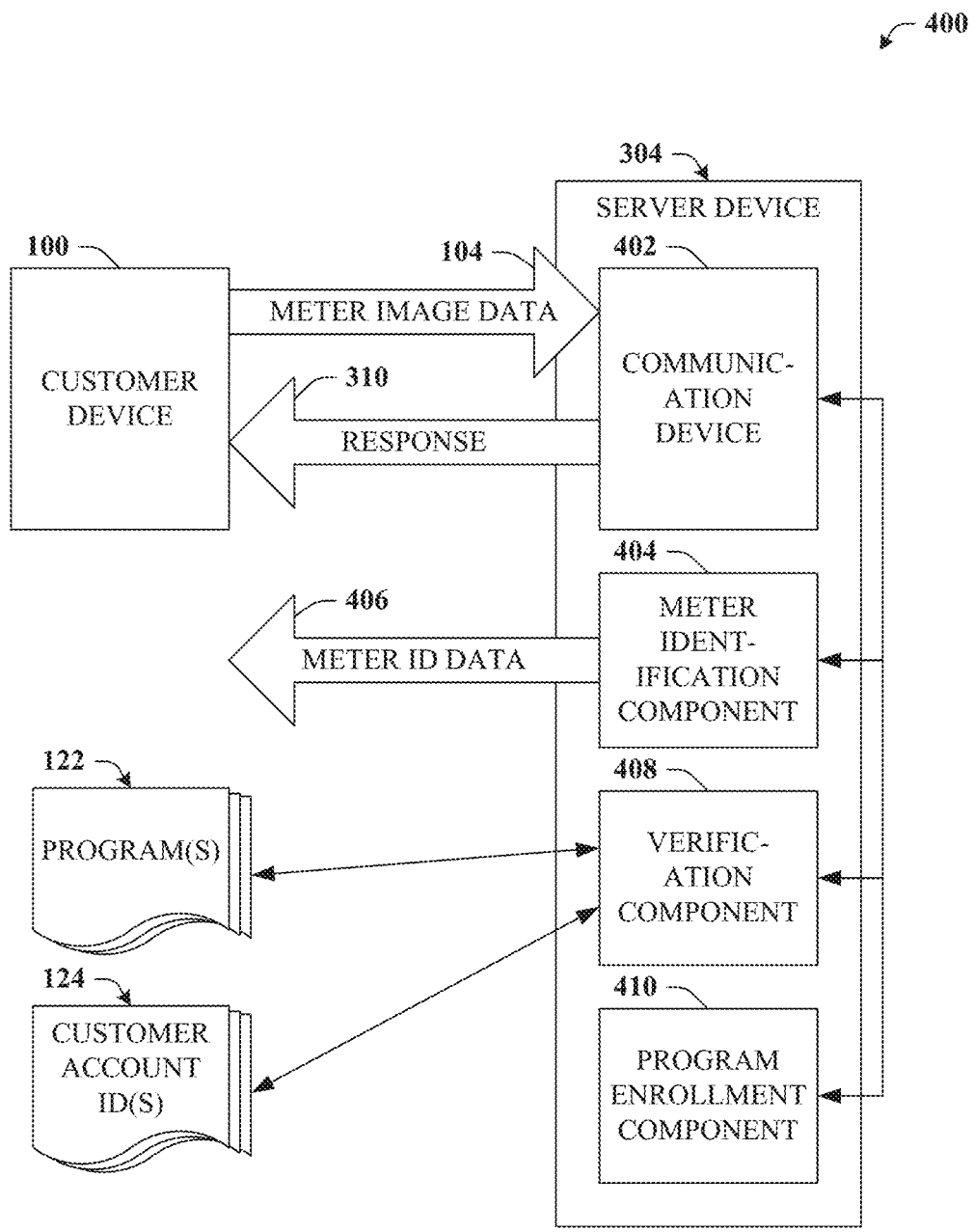
FIG. 4 illustrates a block diagram of an example system that provides additional aspects, elements, or detail in connection with the server device in accordance with certain embodiments of this disclosure.

Referring to FIG. 4, system 400 is provided. System 400 provides additional aspects, elements, or detail in connection with the server device 304 in connection with some embodiments. For example, translation of meter image data 104 can be accomplished in some embodiments at customer device 100, as disclosed in connection with FIG. 1. In other embodiments, translation of meter image data 104 can be accomplished at server device 304, as now described. Server device 304 can include communication device 402 that can be configured to receive meter image data 104. As noted, meter image data 104 can represent an image of a meter device 106 that monitors consumption of a resource 108 provided by a resource provider 110 associated with server device 304.

Server device 304 can include meter identification component 404 that can analyze image 105 and/or associated meter image data 104 an in response generate meter ID data 406. In some embodiments, meter ID data 406 can be substantially similar to meter ID data 114 detailed in connection with FIG. 1. Verification component 408 can be configured to identify a customer account identity 124 based on meter ID data 406. Verification component 408 can further verify that customer account identity 124 is eligible to enroll in a particular program 122 offered by resource provider 110 to customers of the resource provider 110. Program enrollment component 410 can be configured to enroll the customer account identity 124 in program 122. Hence, response 310 can be provided to customer device 100.

Figure 5:
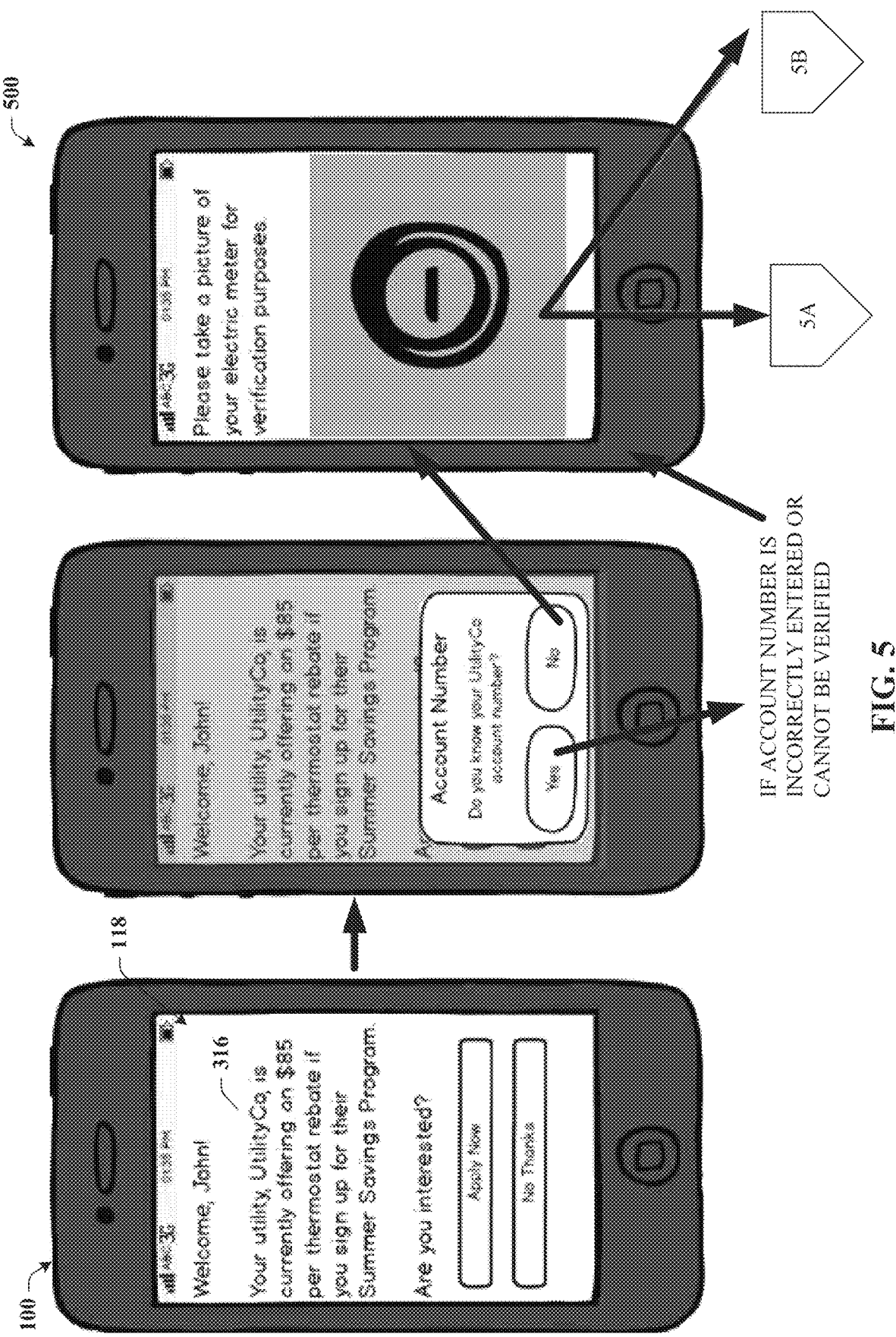
FIGS. 5 and 6 depict various graphical illustrations relating to an example customer device in accordance with certain embodiments of this disclosure.
Figure 6:
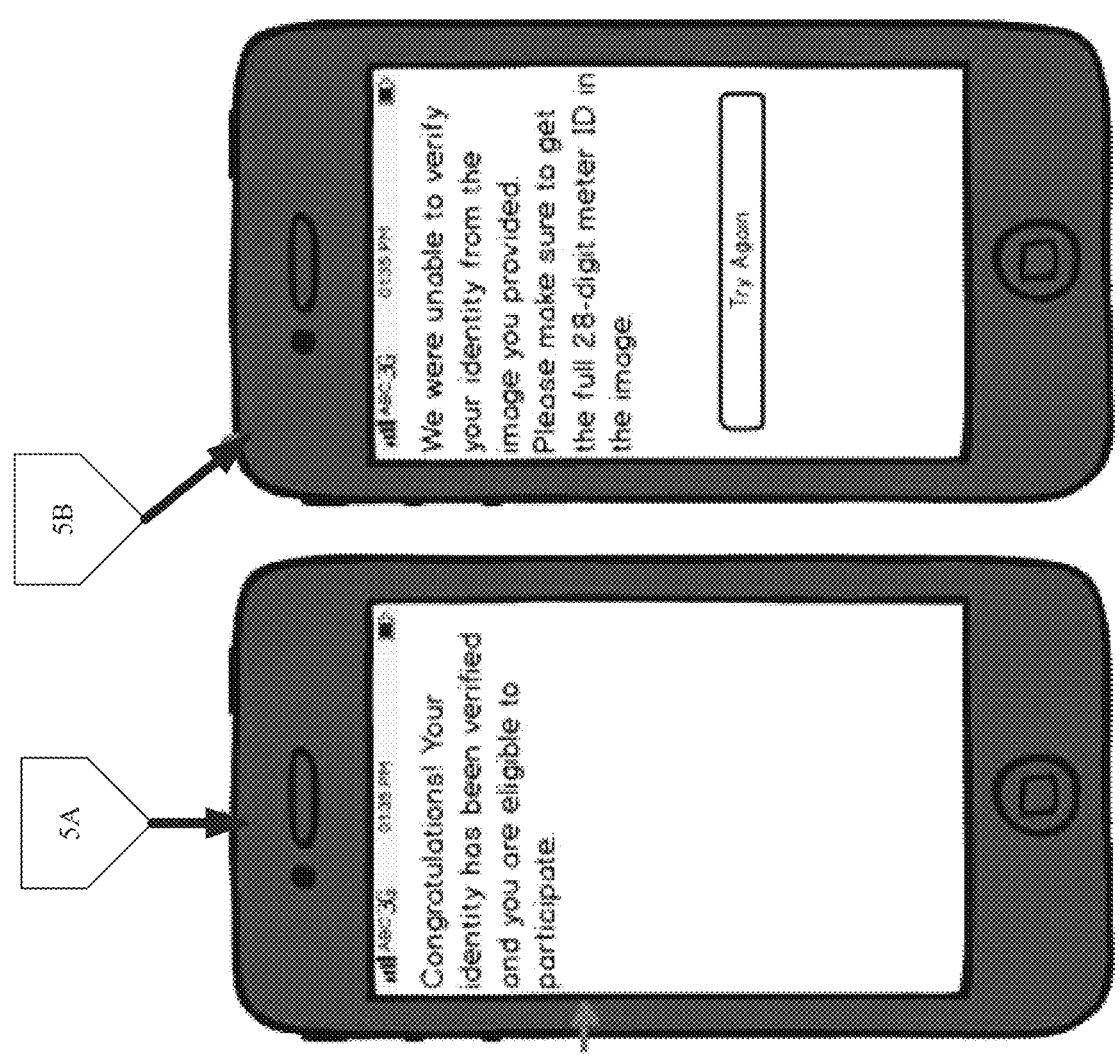

FIGS. 5 and 6 depict various graphical illustrations relating to an example customer device 100. In these examples, customer device 100 is depicted as a smart phone that includes a camera (e.g., imaging device 102) and a touch screen (e.g., display 118). Reviewing from left-to-right, initially, the phone presents advertisement 316 indicating that a per-thermostat rebate of $85 can be received by signing up for a particular program 122 offered by resource provider 110. If the customer decides to apply, an information screen can be presented asking if the customer knows his or her account number. If not (or if so, but the account number is not entered correctly or otherwise cannot be verified), then another information screen can be presented that directs the customer to take a picture of meter device 106. In some embodiments, a previously stored image of meter device 106 (e.g., stored at the time of install of meter device 106) can be used.

If the meter image data 104 is sufficient, then the customer can be enrolled and an information screen (via insert 5A) depicted at FIG. 6 can be presented. If meter image data 104 is not sufficient, then another information screen (via insert 5B) depicted at FIG. 6 can be presented. In the latter case, additional information 314 can be requested or another image of meter device 106 may be requested.

Example Methods for Image-Based Verification

Figure 7:
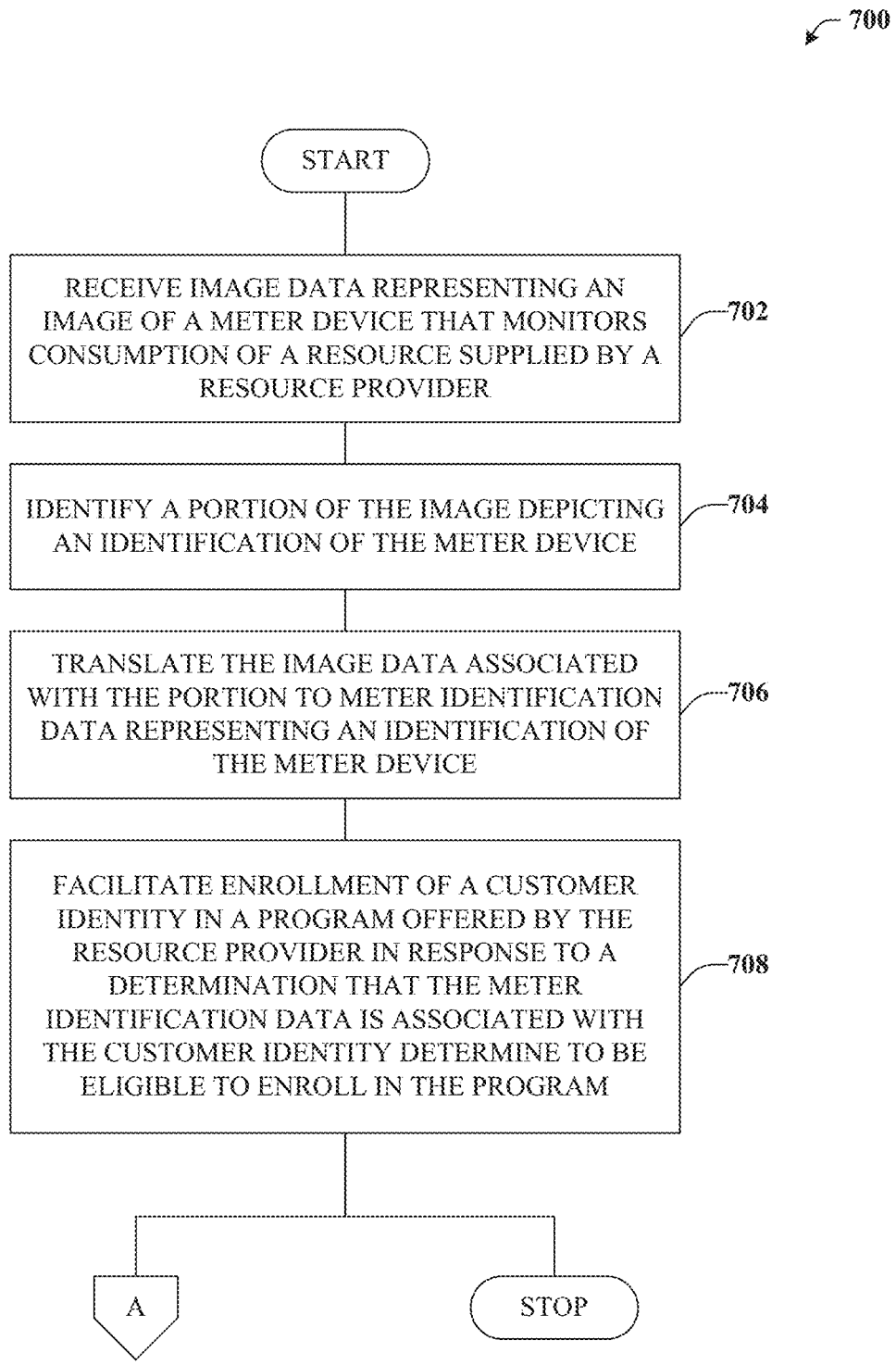
FIG. 7 illustrates an example methodology that can facilitate customer account identification based on an image of the customer's resource meter in accordance with certain embodiments of this disclosure.
Figure 8:
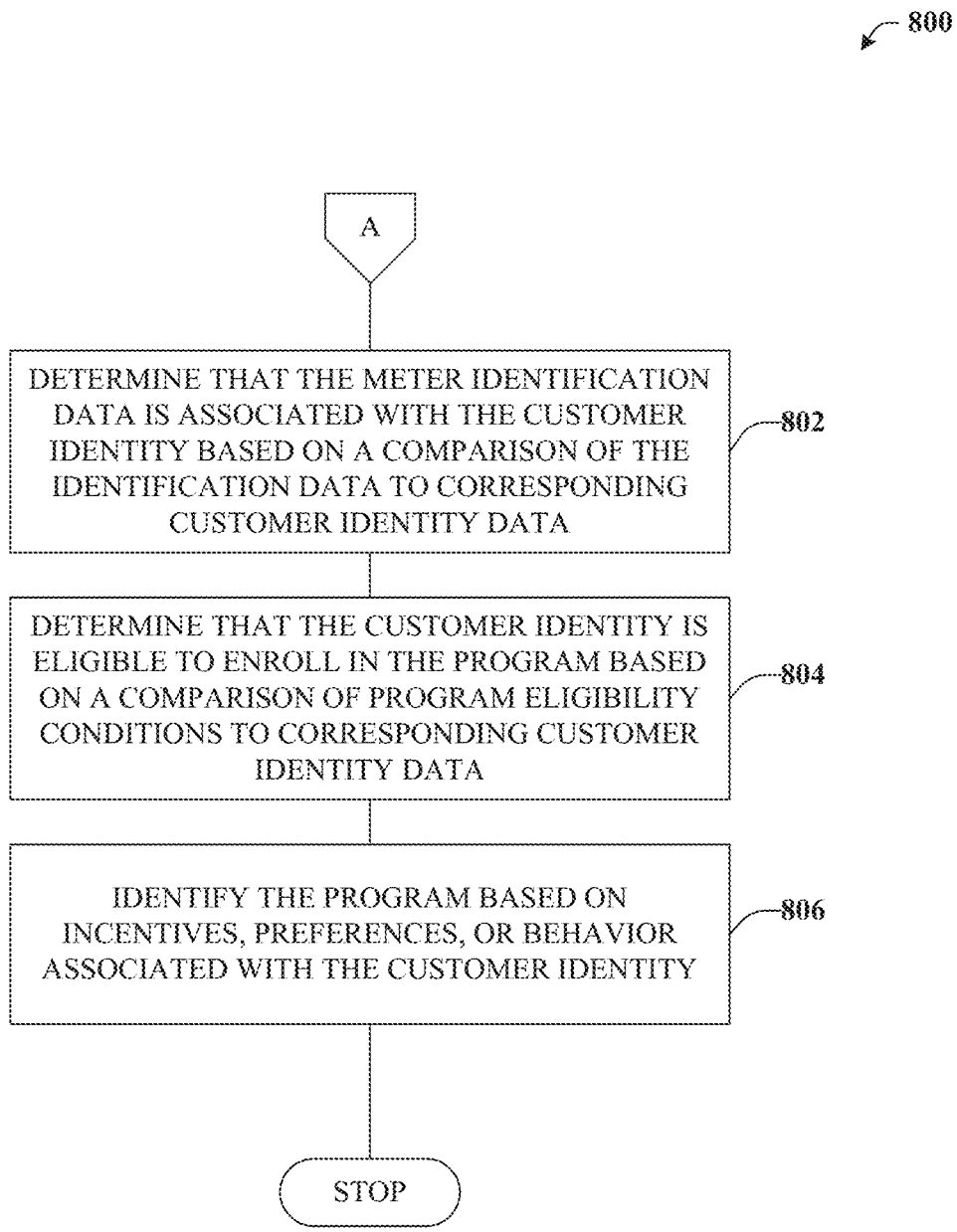
FIG. 8 illustrates an example methodology that can provide for additional elements or aspects in connection with customer account identification based on an image of the customer's resource meter in accordance with certain embodiments of this disclosure.

FIGS. 7 and 8 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 7 illustrates exemplary method 700. Method 700 can facilitate customer account identification based on an image of the customer's resource meter. For example, at reference numeral 702, image data representing an image of a meter device that monitors consumption of a resource supplied by a resource provider can be received.

At reference numeral 704, a portion of the image can be identified. The portion of the image identified can include an identification for the meter device. For example, the meter device can be identified by a serial number, a bar code, a QR code, or the like. At reference numeral 706, the image data associated with the portion (e.g., the portion that includes the identification for the meter device) can be translated to meter identification data representing an identification of the meter device. Said differently, the image of the serial number or other code can be translated to identification data, for example by way of optical character recognition (OCR) techniques.

At reference numeral 708, method 700 can facilitate enrollment of a customer identity in a program offered by the resource provider. Such enrollment can be facilitated in response to a determination that the meter identification data is associated with the customer identity (e.g., that a particular meter is assigned to that particular customer) and that the customer identity is determined to be eligible to enroll in the program. Method 700 can end or proceed to insert A, which is further detailed in connection with FIG. 8.

FIG. 8 illustrates exemplary method 800. Method 800 can provide for additional elements or aspects in connection with customer account identification based on an image of the customer's resource meter. Method 800 can begin at insert A continued from Method 700 of FIG. 7 at proceed to reference numeral 802. At reference numeral 802, it can be determined that the meter identification data is associated with the customer identity based on a comparison of the identification data to corresponding customer identity data. For example, it can be determined that a particular meter is assigned to that particular customer, which is a determination that can be utilized at reference numeral 708 of FIG. 7.

At reference numeral 804, it can be determined that the customer identity is eligible to enroll in the program, which is another determination that can be utilized at reference numeral 708, for instance in order to facilitate enrollment in the program. The determination that the customer is eligible to enroll in the program can be based on a comparison of program eligibility conditions to corresponding customer identity data.

At reference numeral 806, the program can be identified based on incentives, preferences, or behavior associated with the customer identity. For example, based on various data associated with the customer, offers or advertisements can be provided to the customer. As another example, customer information might also be employed in order to determine whether or not the customer is eligible to enroll in the program.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
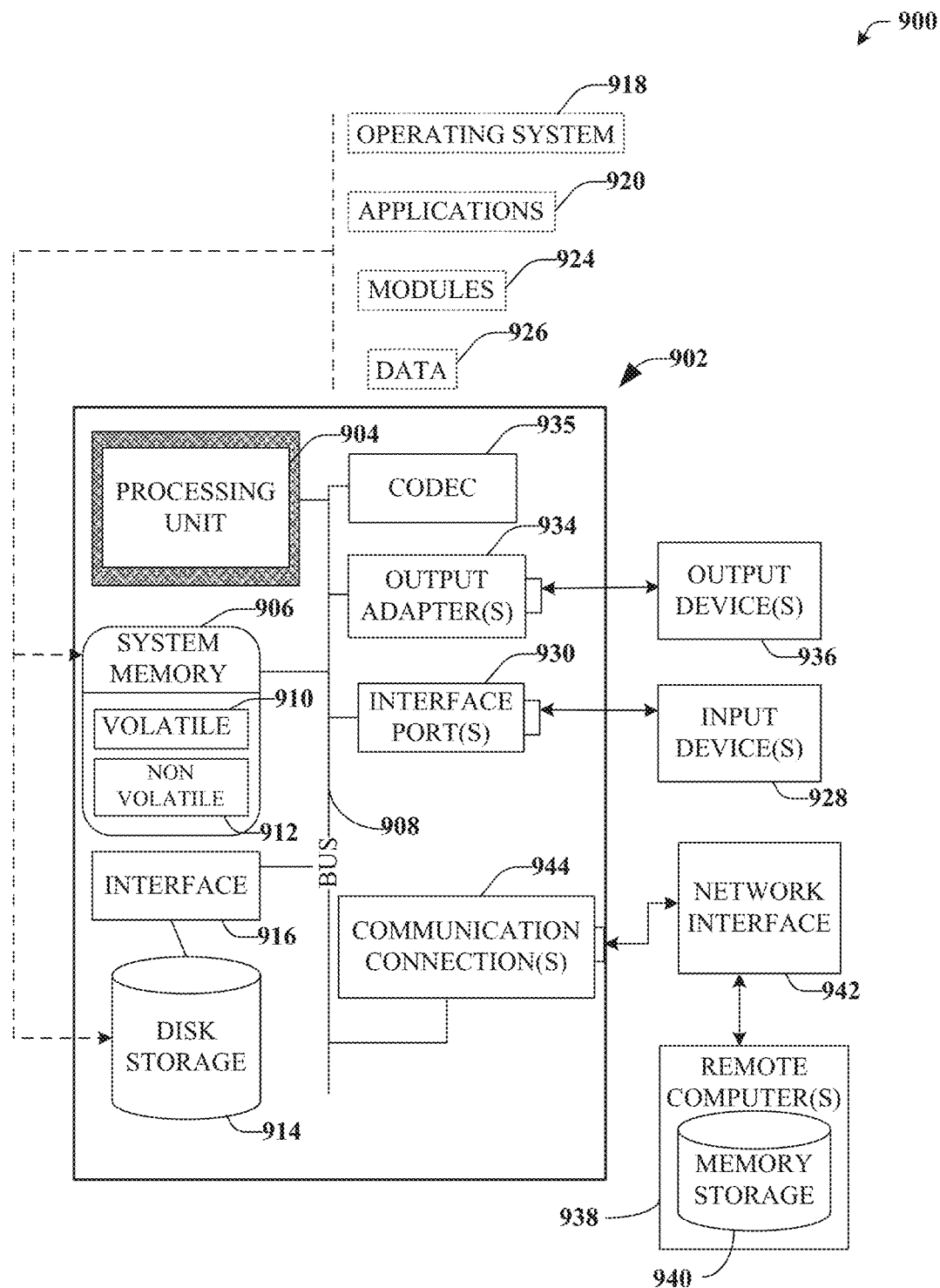
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI) or others now in existence or later developed.

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software.

Although, codec 935 is depicted as a separate component, codec 935 may be contained within non-volatile memory 912 or included in other components detailed herein. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), resistive RAM (RRAM), or others now in existence or later developed.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to authorize having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
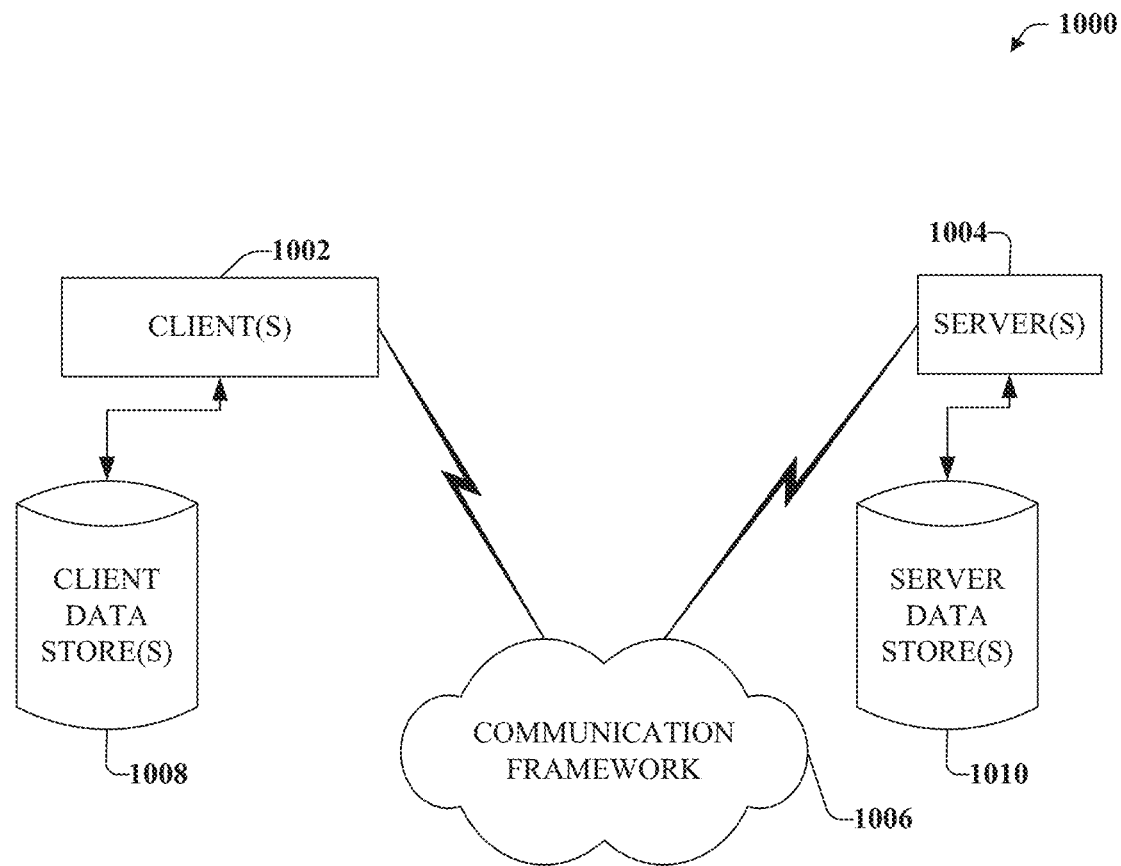
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A customer device, comprising:
    an imaging device that generates meter image data representing an image of a meter device that monitors consumption of a resource provided by an associated resource provider, wherein the image depicts a portion of the meter device comprising an indicium that identifies the meter device;
    a meter identification component that analyzes the image to identify the portion of the meter device comprising the indicium that identifies the meter device, analyzes the identified portion of the meter device to extract the indicium depicted in the image and, in response, uses image processing to translate the indicium depicted in the image into meter identification data representing data that identifies the meter device;
    a program discovery component that:
        interfaces to a server device of the resource provider;
        requests program information relating to programs offered by the resource provider based on an eligibility determination that a customer account identity linked to the meter device identified by the meter identification data is eligible to enroll in the programs; and
        presents to a display an advertisement for a program of the programs comprising at least a portion of the program information; and a program enrollment component that presents, to the display, an indication that enrollment in the program offered by the resource provider to customers of the resource provider has been successful, the program enrollment component accomplishing enrollment using the meter identification data by:
  providing, to the server device of the resource provider, the meter identification data,
  detecting, after providing the meter identification data to the server device of the resource provider, a signal output by the meter device, the signal output by the meter device having been sent from the server device of the resource provider to the meter device in response to the server device of the resource provider receiving the meter identification data from the program enrollment component,
  transmitting, to the server device of the resource provider, the detected signal output by the meter device to verify the customer account identity by confirming that the customer device is located at the meter device, and
  determining that enrollment in the program offered by the resource provider has been successful based on the server device of the resource provider confirming that verification of the customer account identity using the detected signal output by the meter device was successful.

2. The customer device of claim 1, wherein the resource is one of electricity, gas, steam, air, or water.

3. The customer device of claim 1, wherein the indicium is at least one of an alpha-numeric code, a bar code, or a quick response (QR) code.

4. The customer device of claim 1, wherein the program discovery component filters the program information relating to programs offered by the resource provider based on incentives to, preferences of, or behavior of the customer account identity.

5. The customer device of claim 1, wherein the program enrollment component interfaces to the server device associated with the resource provider, transmits the meter identification data to the server device, and receives a response that indicates the customer account identity has been enrolled in the program.

6. The customer device of claim 5, wherein the program enrollment component receives from the server device a request for additional information relating to the meter identification data or the customer account identity, transmits the additional information to the server device and receives the response.

7. The customer device of claim 6, wherein the program enrollment component presents to the display a request associated with the additional information and in response receives the additional information.

8. The customer device of claim 5, wherein the program enrollment component transmits to the server device the meter identification data and metadata associated with the image.

9. The customer device of claim 8, wherein the metadata relates to latitude coordinates or longitude coordinates.

10. A server device, comprising:
  a communication device that receives meter image data representing an image of a meter device that monitors consumption of a resource provided by a resource provider associated with the server device, wherein the image depicts a portion of the meter device comprising an indicium that identifies the meter device;
  a meter identification component that analyzes the image to identify the portion of the meter device comprising the indicium that identifies the meter device, analyzes the identified portion of the meter device to extract the indicium depicted in the image and, in response, uses image processing to translate the indicium depicted in the image into meter identification data representing data that identifies the meter device;
  a verification component that identifies a customer account identity based on the meter identification data and verifies the customer account identity is eligible to enroll in a program offered by the resource provider to customers of the resource provider;
  a communication component that transmits an advertisement for the program and, in response, receives an acknowledgement that the program has been accepted; and
  a program enrollment component that enrolls the customer account identity in the program, the program enrollment component accomplishing enrollment by:
    receiving, from a consumer device, the meter identification data,
    in response to receiving the meter identification data from the consumer device, sending, to the meter device, a signal to be output by the meter device at a location of the meter device,
    receiving, from the consumer device and after sending the signal to be output by the meter device at the location of the meter device, a signal detected by the consumer device,
    verifying that the received signal detected by the consumer device matches the signal sent to the meter device to verify the customer account identity by confirming that the customer device is located at the meter device, and
    enrolling the customer account identity in the program offered by the resource provider based on the verification that the received signal detected by the consumer device from the meter device matches the signal sent to the meter device.

11. The server device of claim 10, wherein the resource is electricity, gas, or water and the indicium depicted in the image is an alpha-numeric code, a bar code, or a quick response (QR) code.

12. The server device of claim 10, wherein the communication device interfaces to a customer device associated with the customer account identity, receives the meter image data from the customer device, and transmits a response that indicates the customer account identity has been enrolled in the program to the customer device.

13. The server device of claim 10, wherein the verification component determines a request for additional information in connection with identification of the customer account identity.

14. The server device of claim 13, wherein the communication device transmits to a customer device the request for additional information and receives a response to the request for additional information from the customer device.

15. The server device of claim 10, wherein the verification component identifies the customer account identity based on the meter identification data and metadata associated with the image.

16. The server device of claim 15, wherein the metadata relates to latitude coordinates or longitude coordinates.

17. A method, comprising:
- receiving, by a device comprising a processor, image data representing an image of a meter device that monitors consumption of a resource supplied by a resource provider;
- analyzing, by the device, the image to identify a portion of the image of the meter device depicting an indicium that identifies the meter device;
- analyzing, by the device, the identified portion of the image of the meter device to extract the indicium depicted in the image;
- using image processing, by the device, to translate the indicium depicted in the image into meter identification data representing an identification of the meter device;
- transmitting, by the device, an advertisement for a program offered by the resource provider in response to a determination that the meter identification data references a customer identity that is determined to be eligible to enroll in the program; and
- in response to receiving agreement data, enrolling, by the device, the customer identity in the program, the enrollment being accomplished by:
  - receiving, from a consumer device, the meter identification data,
  - in response to receiving the meter identification data from the consumer device, sending, to the meter device, a signal to be output by the meter device at a location of the meter device,
  - receiving, from the consumer device and after sending the signal to be output by the meter device at the location of the meter device, a signal detected by the consumer device,
  - verifying that the received signal detected by the consumer device matches the signal sent to the meter device to verify the customer account identity by confirming that the customer device is located at the meter device, and
  - enrolling the customer account identity in the program offered by the resource provider based on the verification that the received signal detected by the consumer device from the meter device matches the signal sent to the meter device.

18. The customer device of claim 1, wherein the meter identification component provides real-time feedback as to whether additional information is necessary to identify the customer account identity or whether quality of the image was not satisfactory.

19. The customer device of claim 1, wherein the signal sent from the server device is a signal sent via an advanced meter infrastructure network to the meter device or a signal to insert noise on top of an electrical signal measured by the meter device.

* * * * *